United States Patent [19]

Londner

[11] 4,050,108

[45] Sept. 27, 1977

[54] METHOD OF MANUFACTURING OF SHOES AND SHOES THUS MANUFACTURED

[76] Inventor: Rosette Londner, 32, rue du Calvaire, Saint-Cloud, Hauts de Seine, France

[21] Appl. No.: 738,542

[22] Filed: Nov. 3, 1976

[30] Foreign Application Priority Data

Nov. 13, 1975 France .................................. 75.34652

[51] Int. Cl.$^2$ .......................... A43D 9/00; A43B 1/10
[52] U.S. Cl. .......................................... 12/142 E; 36/4
[58] Field of Search .......... 12/142 R, 142 E, 142 EV; 36/4, 7.1, 7.3, 68, 69

[56] References Cited

U.S. PATENT DOCUMENTS

| | | | |
|---|---|---|---|
| 1,162,454 | 11/1915 | Clark | 12/142 E |
| 2,617,208 | 11/1952 | Marx et al. | 12/142 EV |
| 3,921,313 | 11/1975 | Mahide et al. | 36/4 |
| 3,975,840 | 8/1976 | Juzenko | 12/142 E |

Primary Examiner—Patrick D. Lawson
Attorney, Agent, or Firm—Michael J. Striker

[57] ABSTRACT

In a first overmolding operation, a starting element in the form of a high-cut sock lining of flexible material such as leather is coated with a composition which permits bonding and is then overmolded with a part forming an instep shank for the sole, a rear stiffening counter and a heel seat or heel body. In a second overmolding operation, the shoe is overmolded on both the upper and the body of the sole with an outer coating which consists of relatively flexible plastic material. Potential applications of the shoe include sports such as ice skating, skiing, mountaineering and fooball.

5 Claims, 8 Drawing Figures

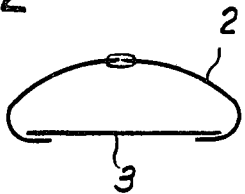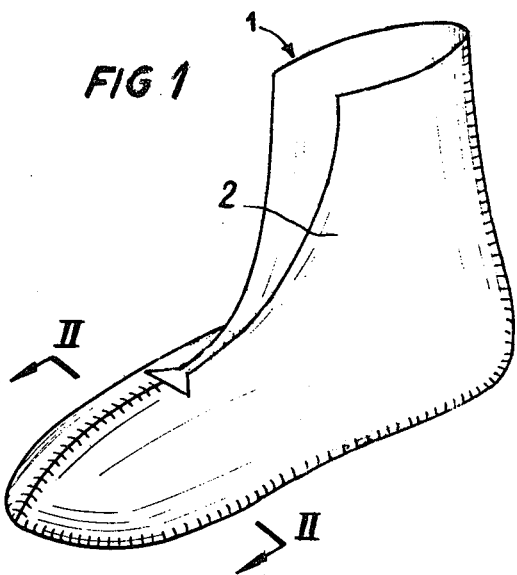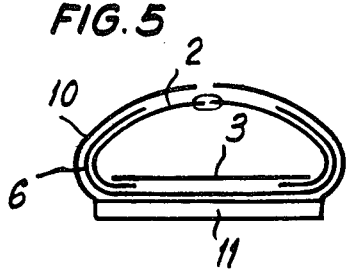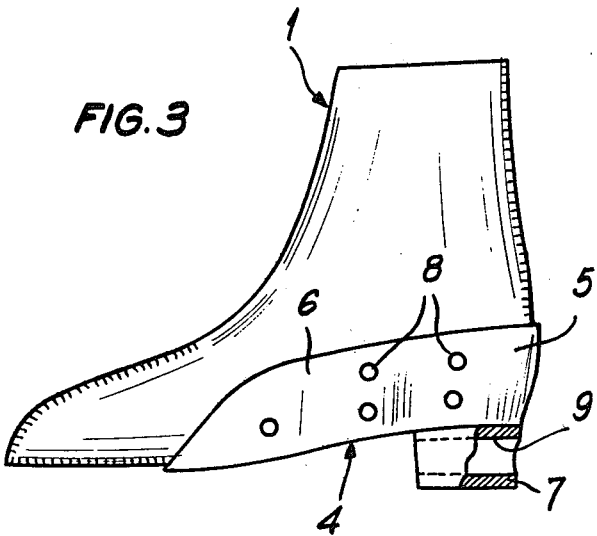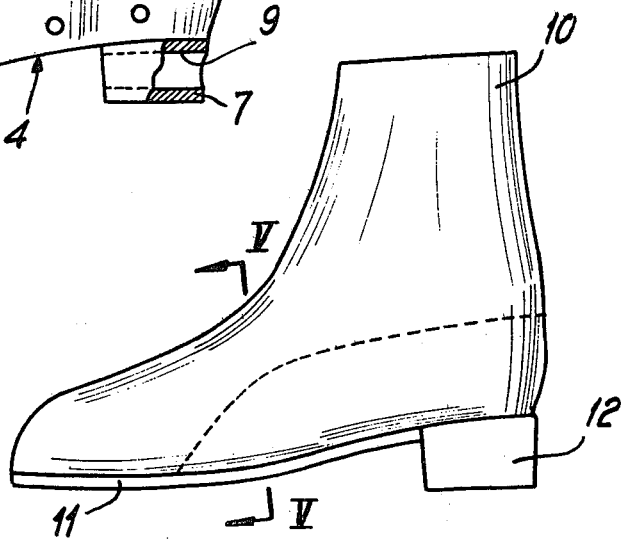

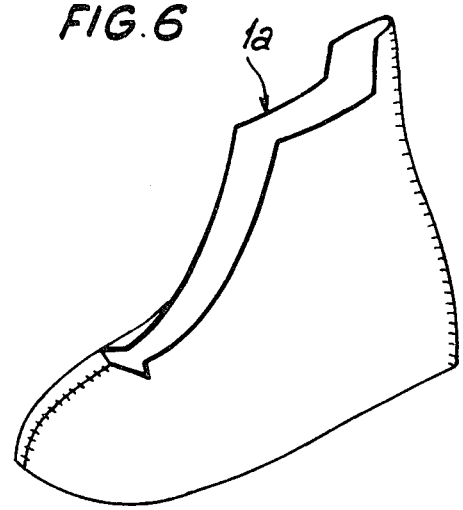
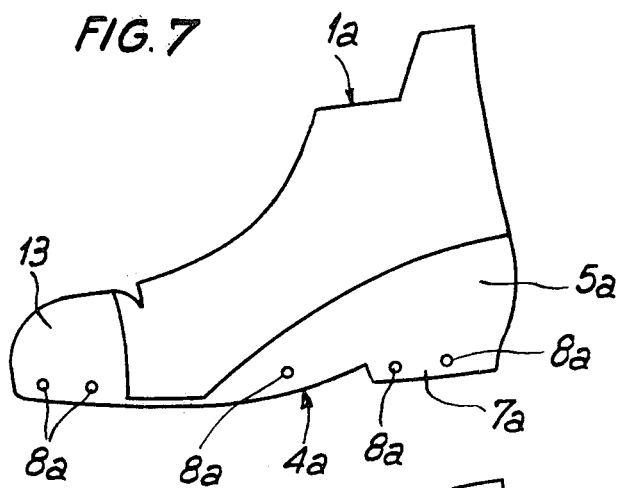
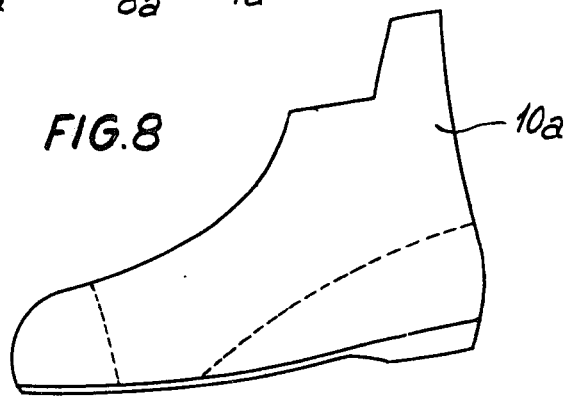

METHOD OF MANUFACTURING OF SHOES AND SHOES THUS MANUFACTURED

This invention relates to the manufacture of shoes, especially shoes designed for ice-skating or certain other sports.

In order to reduce the cost price of shoes of this type as well as to obtain perfect water-tightness, it has already been proposed to manufacture these shoes by molding of plastic material. By carrying out a single molding operation, however, it is not possible to produce a shoe which meets the conditions required in the case under consideration. Shoes of this type must in fact have rigid portions while other portions are endowed with a certain degree of flexibility.

In order to solve this problem, it has therefore been proposed to manufacture shoes of this type by overmolding on a starting element or preform of suitable material. But in this case also, the problem which is thus presented cannot be satisfactorily solved by means of this technique. Furthermore, the methods of manufacture employed at the present time do not ensure perfect interassembly of the different components of a shoe of this type.

The present invention accordingly has for its object a novel method of manufacture which is intended to solve these various problems and to overcome the disadvantages recalled in the foregoing. This method consists in making use of a starting element in the form of a high-cut sock lining of flexible material such as leather, for example, and in employing a rigid plastic material in a first overmolding operation, in coating the starting element with a composition which permits bonding of the corresponding material and then in overmolding on said starting element a part which forms both an instep shank for the sole, a rear stiffening counter and the heel seat or heel body. In a second overmolding operation which entails the use of a relatively flexible plastic material, the complete assembly is overmolded with an external coating which forms a covering for the upper as well as the main portion or body of the sole.

By virtue of its basic design concept, the method under consideration therefore makes it possible to produce a shoe having both flexible portions and portions which have relatively high rigidity. However, perfect cohesion of these different portions is ensured and there is not any potential danger of unsticking of the overmolded portions with respect to the starting element or preform.

It is readily apparent that the invention also has for its object the shoes which are manufactured by means of the method under consideration. Moreover, further properties and advantages of the invention will become apparent from the following description which is given solely by way of example, reference being had to the accompanying drawings, wherein:

FIG. 1 is a view in perspective showing the sock lining of flexible material which is employed as a starting element;

FIG. 2 is a sectional view taken along line II—II of FIG. 1;

FIG. 3 is a view in side elevation showing the same starting element after this latter has been overmolded with a first complementary portion of plastic material;

FIG. 4 is a similar view showing the shoe obtained on completion of the second overmolding operation;

FIG. 5 is a sectional view taken along line V—V of FIG. 4;

FIG. 6 is a view which is similar to FIG. 1 and shows the starting element employed for the manufacture of a shoe for ice-hockey skating;

FIG. 7 is a view which is similar to FIG. 3 and shows the same starting element after overmolding with a first complementary portion of plastic material;

FIG. 8 is a view in elevation showing the hockey shoe thus obtained on completion of the second overmolding operation.

In the method according to the invention, there is employed as starting element a high-cut sock lining 1 which is made of leather or like flexible material. Said sock lining has an upper 2 of flexible material and an insole 3 of material having a lower degree of flexibility; bonding of these latter can be carried out by cementing the lower edges of the upper against the underface of the sole (as shown in FIG. 2).

In a first overmolding operation, said starting element is overmolded with a complementary part in a single piece which forms both an instep shank 4 for the sole, a rear stiffening counter 5 which extends at 6 along the sides of the lower portion of the upper, and the body 7 of the heel for the corresponding shoe. This overmolded part is formed of rigid plastic material such as polyvinyl chloride or polyurethane, for example.

To this end, the starting element 1 is placed in an injection mold around which are formed cavities so as to permit molding of the different portions of the part to be formed. It is particularly worthy of note in this connection that raised portions or cavities are formed on said part at the time of molding in order to facilitate subsequent bonding of the outer coating, said coating being in turn intended to be overmolded later on during a second overmolding operation. Said raised portions or cavities can consist of hollow depressions 8 formed in the counter 5 or else of a hole 9 which is formed in the heel body 7 and passes right through this latter so as to open on two opposite faces.

It should also be noted, however, that the sock lining 1 employed as starting element is provided before hand with a coating having a synthetic resin base with a view to permitting excellent bonding of the part which is thus overmolded during the first overmolding operation. Just before this operation, the constituent material of said coating is "re-activated" by heating. Thus the material of the overmolded part is made wholly integral with the sock lining 1 and is not liable to become detached from this latter. After this first operation, a further coating with material having a synthetic resin base is formed on the entire starting element and on the first part which is overmolded on this latter with a synthetic resin which is also intended to permit perfect bonding of the outer coating 10 which is overmolded during a second overmolding operation. This operation is performed in another mold having cavities adapted to permit overmolding of the outer coating over the entire surface of the upper as well as overmolding of the main portion or body 11 of the sole and of a heel coating 12. In the case of this second overmolding operation, there can be employed a relatively flexible plastic material which can be of the same type as that employed during the first operation, for example polyvinyl chloride or polyurethane, the proportions of plasticizers being nevertheless different in order to obtain a higher degree of flexibility. As a result of preliminary coating of the starting element and of the first part which has already been overmolded on this latter, the outer coating which is overmolded during this second operation is made perfectly integral with the other shoe components.

It must be noted in this connection that the different constituent elements of the shoe are shown separately in FIG. 5 only with a view to gaining a better understanding of the figure. In actual fact these elements are intimately secured to each other and endowed with perfect cohesion which prevents any risk of dissociation.

By reason of the method of manufacture which is thus employed, the shoe under consideration is perfectly watertight and is of highly rugged design, thus making it particularly suitable for use in certain sports, especially iceskating. None the less, the original concept of the present method is such that the shoe can be provided at the same time both with rigid portions, namely the sole shank, the lower counter and the heel body, and relatively flexible portions, namely the upper and certain portions of the sole. This result is evidently obtained by virtue of the manufacture of said sole in a number of operations and by making use of different and distinct materials. However, as has already been mentioned, the different components of the shoe are perfectly secured to each other and are not liable to be dissociated.

As illustrated in FIGS. 1 to 4, the method under consideration can be employed for the manufacture of boots designed for figure-skating on ice. However, as illustrated in FIGS. 6 to 8, the method can also be employed in the manufacture of shoes for ice-hockey skating. In this case, the shape of the sock lining 1a which is employed as a starting element is slightly different. However, the main difference lies in the composition of the first part which is overmolded on said starting element. In such a case, said part is not only provided with an instep shank 4a for the sole and a rear stiffening counter 5a but also with a bull-nosed front end 13 which surrounds the front end of the sock lining 1a. Furthermore, said first part also forms the heel body 7a but this latter is less pronounced than in the previous case. It will be wholly apparent that the bull-nosed front reinforcement 13 is integral with the sole shank 4a which is extended to the front end over a sufficient distance. Preferably, cavities or depressions 8a are formed in the external surface of said first part in order to facilitate bonding of the outer coating 10a which is then overmolded on the entire assembly.

As in the previous example, the first overmolded part is formed of rigid plastic material in order to give a high degree of rigidity to the corresponding portions of the shoe, namely the shank, the counter and the front end of the upper.

On the other hand, the outer coating 10a which is overmolded during the second overmolding operation is formed of flexible plastic material in order to endow the upper with the necessary flexibility.

However, the method in accordance with the invention can also be employed in the manufacture of different types of shoes, among which can be mentioned games shoes and sports shoes such as ski boots, mountain boots, football boots and so forth. As will be readily apparent, the shape of the shoes thus manufactured can vary according to requirements and applications.

I claim:

1. A method of manufacture of shoes by overmolding of a layer of plastic material on a starting element, wherein said method consists in making use of a starting element in the form of a high-cut sock lining of flexible material such as leather, for example, and in a first overmolding operation in employing a rigid plastic material, in coating the starting element with a composition which permits bonding of the corresponding material and then in overmolding on said starting element a part which forms both an instep shank for the sole, a rear stiffening counter and the heel seat or heel body, then in a second overmolding operation which entails the use of a relatively flexible plastic material and, after a second coating with a composition which permits bonding of the corresponding material, the complete assembly is overmolded with an outer coating which forms a covering for the upper and gives said upper its final shape and for the main body of the sole.

2. A method according to claim 1, wherein the part thus formed is provided at the time of the first overmolding operation with one or a number of raised portions or holes or cavities adapted to permit more effective bonding of the outer coating which is overmolded during the second operation.

3. A method according to claim 1, wherein a part which also forms a bull-nosed front end is overmolded at the time of the first overmolding operation for the manufacture of certain types of shoes requiring an end reinforcement and wherein said bull-nosed portion surrounds the front end of the sock lining which is employed as a starting element, said bull-nosed reinforcement being integral with the instep shank of the sole.

4. A shoe which is manufactured by application of the method according to claim 1, wherein said shoe comprises an outer layer of flexible plastic material overmolded on a starting element in the form of a high-cut sock lining of flexible material which carries a previously overmolded part or relatively rigid plastic material forming both the sole shank and a rear stiffening counter as well as the heel body if necessary.

5. A shoe according to claim 4 as manufactured by application of the method according to 3 and wherein the part which is initially overmolded on the starting element and formed of rigid plastic material comprises a bull-nosed front end which surround the front end of the sock lining employed as starting element.

* * * * *